United States Patent
Song et al.

(10) Patent No.: US 10,594,117 B2
(45) Date of Patent: Mar. 17, 2020

(54) WIRE INSTALLATION APPARATUS AND CONTROL METHOD THEREOF

(71) Applicant: LG ELECTRONICS INC., Seoul (KR)

(72) Inventors: Hyunsup Song, Seoul (KR); Dongseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 172 days.

(21) Appl. No.: 15/496,396

(22) Filed: Apr. 25, 2017

(65) Prior Publication Data

US 2017/0317479 A1 Nov. 2, 2017

(30) Foreign Application Priority Data

May 2, 2016 (KR) .................. 10-2016-0054211

(51) Int. Cl.
| | |
|---|---|
| *E01B 29/26* | (2006.01) |
| *H02G 1/06* | (2006.01) |
| *E04H 15/62* | (2006.01) |
| *H02G 9/02* | (2006.01) |
| *A01D 34/00* | (2006.01) |
| *B25C 5/11* | (2006.01) |

(52) U.S. Cl.
CPC ............ *H02G 1/06* (2013.01); *A01D 34/001* (2013.01); *E01B 29/26* (2013.01); *E04H 15/62* (2013.01); *H02G 9/02* (2013.01); *A01D 34/008* (2013.01); *B25C 5/11* (2013.01)

(58) Field of Classification Search
CPC . H02G 9/02; H02G 1/06; E04H 15/62; E02D 5/80; E01B 29/26; E01B 29/32; B25C 1/02; B25C 11/00; B25C 5/11

USPC .......... 104/17.1; 254/18, 134.3 R, 133.4 FT; 227/147
See application file for complete search history.

(56) References Cited

U.S. PATENT DOCUMENTS 1,916,708 A * 7/1933 Zavatkay ............... E01B 29/26
104/17.1
3,330,220 A * 7/1967 Stewart .................. E01B 29/26
104/17.1

(Continued)

FOREIGN PATENT DOCUMENTS

| DE | 20 2010 008 445 | 11/2011 |
|---|---|---|
| DE | 20 2014 001 198 | 6/2014 |

(Continued)

OTHER PUBLICATIONS

Korean Notice of Allowance dated Mar. 20, 2018 issued in Application No. 10-2016-0054211.

(Continued)

*Primary Examiner* — Monica S Carter
*Assistant Examiner* — Mahdi H Nejad
(74) *Attorney, Agent, or Firm* — KED & Associates LLP

(57) ABSTRACT

A wire installation apparatus is provided. The wire installation apparatus includes a body through which a peg passes, a reel installed in the body to surround a wire, a wire guide member guiding the wire, and an external force transfer member transferring an external force, applied from the outside, to the peg so that the peg is driven into a ground. The wire is installed by the peg driven into the ground.

16 Claims, 14 Drawing Sheets

(56) References Cited

U.S. PATENT DOCUMENTS

| | | | | |
|---|---|---|---|---|
| 3,468,269 | A | * | 9/1969 | Des Ormeaux ........ D05B 35/02 112/130 |
| 3,470,835 | A | * | 10/1969 | Hoverter, Jr. .......... D05B 65/00 112/290 |
| 3,717,101 | A | * | 2/1973 | Katcha ..................... E01B 29/26 104/17.1 |
| 3,753,405 | A | * | 8/1973 | Bryan, Jr. ............... E01B 29/26 104/17.1 |
| 3,968,952 | A | * | 7/1976 | Newell ................ B66D 1/7447 254/134.3 R |
| 4,582,206 | A | * | 4/1986 | Johnson ................ B66F 11/046 182/2.9 |
| 4,627,563 | A | * | 12/1986 | Meyer ................ A01G 13/0293 227/120 |
| 4,826,066 | A | * | 5/1989 | Koester ..................... B25C 5/11 227/120 |
| 5,025,969 | A | * | 6/1991 | Koester ..................... B25C 5/11 111/106 |
| 5,191,840 | A | * | 3/1993 | Cotic ....................... E01B 29/26 104/17.1 |
| 2003/0218046 | A1 | * | 11/2003 | Mangone, Jr. ............ B25C 5/11 227/147 |
| 2010/0219226 | A1 | * | 9/2010 | Akiba .................... B25C 5/1689 227/8 |
| 2012/0012635 | A1 | * | 1/2012 | Jaffe ........................ B25C 5/11 227/134 |

FOREIGN PATENT DOCUMENTS

| | | | |
|---|---|---|---|
| DE | 102014211000 | * | 6/2014 |
| DE | 10 2014 211 000 | | 12/2015 |
| JP | 2001-222244 | | 8/2001 |
| JP | 2010-220599 | | 10/2010 |
| JP | 2014-208366 | | 11/2014 |
| KR | 20-2013-0000640 | | 1/2013 |
| KR | 10-2015-0125508 | | 11/2015 |

OTHER PUBLICATIONS

European Search Report dated Sep. 6, 2017 issued in Application No. 17168968.0.

* cited by examiner

WIRE INSTALLATION APPARATUS AND CONTROL METHOD THEREOF

CROSS-REFERENCE TO RELATED APPLICATION

Pursuant to 35 U.S.C. § 119(a), this application claims the benefit of earlier filing date and right of priority to Korean Application No. 10-2016-0054211, filed on May 2, 2016, the contents of which is incorporated by reference herein in its entirety.

BACKGROUND

1. Field

The present disclosure relates to an installation apparatus for installing a wire defining an operating area of a moving robot and a control method.

2. Background

Lawn mowers are devices for trimming lawn which are planted on yards of homes, playgrounds, and/or the like. The lawn mowers are categorized into lawn mowers for homes used in homes and lawn mowers for tractors used in wide playgrounds or wide farms.

The lawn mowers for homes are divided into a walk behind type, where a user mows lawn while dragging a lawn mower behind, and a hand type where a user directly carries a lawn mower by hand.

However, in two types of lawn mowers, there is a difficulty in that a user should directly operate a lawn mower.

Particularly, since it is difficult for a user to directly operate a lawn mower to mow lawn on a playground in busy daily life, a laborer for mowing lawn is mainly used, and for this reason, the employment cost is expended.

Therefore, a self-driving lawn mower for preventing the additional cost and reducing inconvenience of a user is being developed. Various researches for controlling the moving performance of a lawn mowing robot.

Unlike an operating area of a robotic vacuum cleaner, an operating area of a lawn mowing robot is not blocked by a wall. Therefore, a user of the lawn mowing robot needs to install a wire in an outer portion of the operating area of the lawn mowing robot.

The installed wire marks a boundary of the operating area of the lawn mowing robot, and moreover, generates an induced current in a coil part of the lawn mowing robot, thereby enabling the lawn mowing robot to sense information associated with an outer line of the operating area of the lawn mowing robot.

However, there is inconvenience in that the user should directly install the wire on a ground where lawn is planted. Particularly, in installing the wire, pegs for fixing the wire should be driven into the ground at certain intervals, and for this reason, much time and cost are expended in a process of installing the wire.

BRIEF DESCRIPTION OF THE DRAWINGS

Embodiments will be described in detail with reference to the following drawings in which like reference numerals refer to like elements and wherein.

The accompanying drawings, which are included to provide a further understanding of the disclosure and are incorporated in and constitute a part of this specification, illustrate exemplary embodiments and together with the description serve to explain the principles of the disclosure.

DETAILED DESCRIPTION

Hereinafter, an embodiment where a moving robot 100*a* according to the present invention drives in an operating area 1000 will be described with reference to FIG. 1A.

For reference, the below-described moving robot 100*a* may perform self-driving in the operating area 1000 where lawn is planted, and may mow lawn existing in the operating area 1000 in the middle of performing the self-driving. Therefore, the moving robot 100*a* described herein may substantially be a lawn mowing robot.

However, the moving robot 100*a* according to the present invention is not limited to the purpose of mowing lawn, and the moving robot 100*a* according to the present invention may be various kinds of robots which drive at an outdoor place.

Figure 1A:
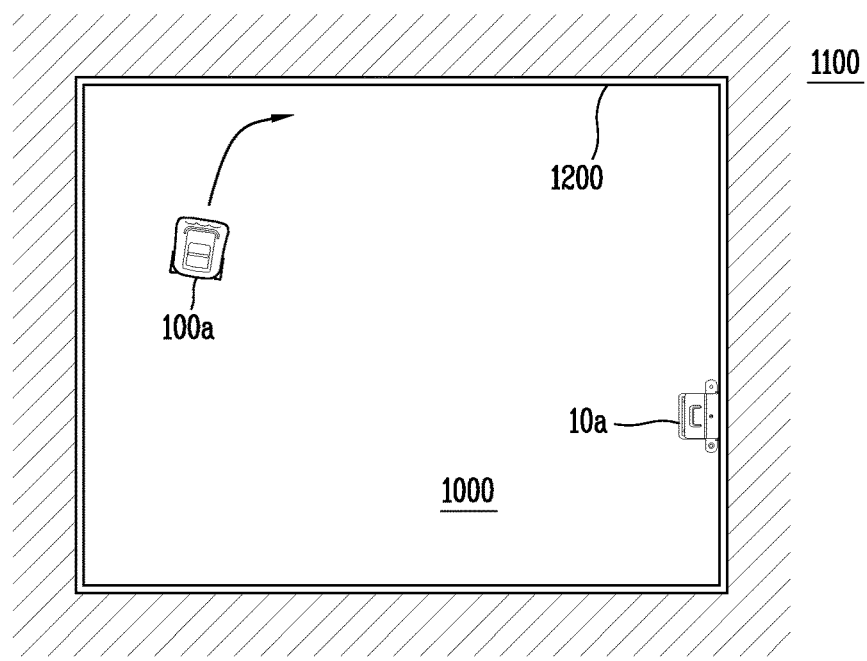
FIG. 1A is a conceptual diagram illustrating an embodiment where a moving robot or a lawn mowing robot for mowing lawn drives.

Referring to FIG. 1A, the moving robot 100*a* may autonomously drive in a certain area. Also, the moving robot 100*a* may perform a specific function in the middle of driving.

In more detail, the moving robot 100*a* may be a lawn mowing robot. In this case, the specific function may be a function of mowing lawn in the operating area 1000.

Moreover, the operating area 1000 may be defined by a boundary wire 1200 provided a closed curve. In detail, the boundary wire 1200 may be installed in an arbitrary area, and the moving robot 100*a* may move in an area defined by the closed curve formed by the boundary wire 1200.

The boundary wire 1200 may be installed in the operating area. In more detail, the boundary wire 1200 may be installed on a boundary line between the operating area 1000 of the moving robot 100*a* and an external area 1100, or may be installed in the operating area 1000 to be spaced apart from by a certain interval.

In this case, a value of the certain interval where the boundary wire 1200 is installed may be changed. Therefore, a user may install the boundary wire 1200 along an outer portion of the operating area 1000, and since it is not required to consider an interval at which the boundary wire 1200 is installed from the outer portion or the external area 1100, the boundary wire 1200 can be more easily installed.

As illustrated in FIG. 1A, a charging device 10 of the moving robot 100*a* may be installed to be connected to the boundary wire 1200. Although not shown, the charging device 10 may be installed in a partial region of the operating area 1000 including an area where the boundary wire 1200 is installed. Also, although not shown in FIG. 1A, the charging device 10 may be installed in a partial region of the operating area 1000 and a partial region of the external area 1100.

The operating area 1000 which is an area where the moving robot 100*a* drives may be provided as a critical region unlike an indoor environment. That is, lawn may be planted in the operating area 1000, and moreover, the operating area 1000 may include various inclined planes, and a floor of the operating area 1000 may be formed of various materials.

Although not shown in FIG. 1A, the operating area 1000 may be divided or defined by a boundary generation device (not shown). The boundary generation device may be installed at one point of the operating area 1000, may generate information associated with a boundary of the operating area 1000, and may transmit the generated information associated with the operating area 1000 to the moving robot 100*a*.

Moreover, the boundary generation device may receive the information associated with the boundary of the operating area 1000 from the moving robot 100*a* and may change the information associated with the boundary of the operating area 1000, based on the information received from the moving robot 100*a*.

For example, the moving robot 100*a* and the boundary generation device may transmit or receive the information associated with the boundary of the operating area 1000 by using at least one wireless communication of Wi-Fi, Wibro, Bluetooth, Zigbee, and ANT.

Hereinafter, a boundary portion between an operating area 1000 and an external area 1100 of a lawn mowing robot will be described with reference to FIG. 1B.

Figure 1B:
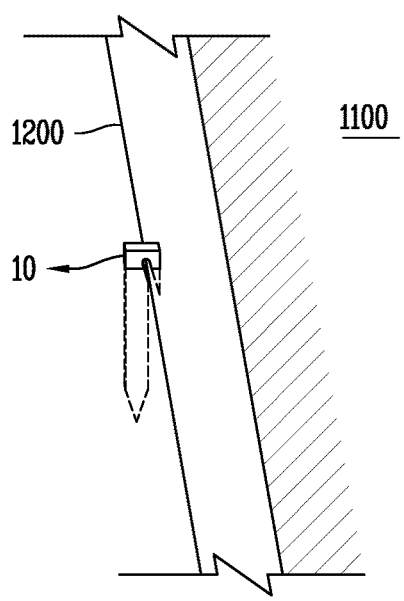
FIG. 1B is a conceptual diagram illustrating a boundary portion of an operating area of a lawn mowing robot.

As illustrated in FIG. 1B, a wire 1200 may be installed apart from the external area 1100 by a certain distance, and the wire 1200 may be installed to be fixed to the ground by a peg 10.

Referring to FIG. 1B, the wire 1200 defining the operating area 1000 of the lawn mowing robot may be fixed by the peg 10 driven into the ground.

There is inconvenience of a user of the related art lawn mowing robot in that the user should directly hammer at several pegs 10, for driving the pegs 10 into the ground. Also, there is inconvenience where the user should hammer at the pegs 10 while continuously moving with a body of the user being bent forward, for installing the wire 1200.

In order to solve such problems, the present invention provides a wire installation apparatus.

Figure 1C:
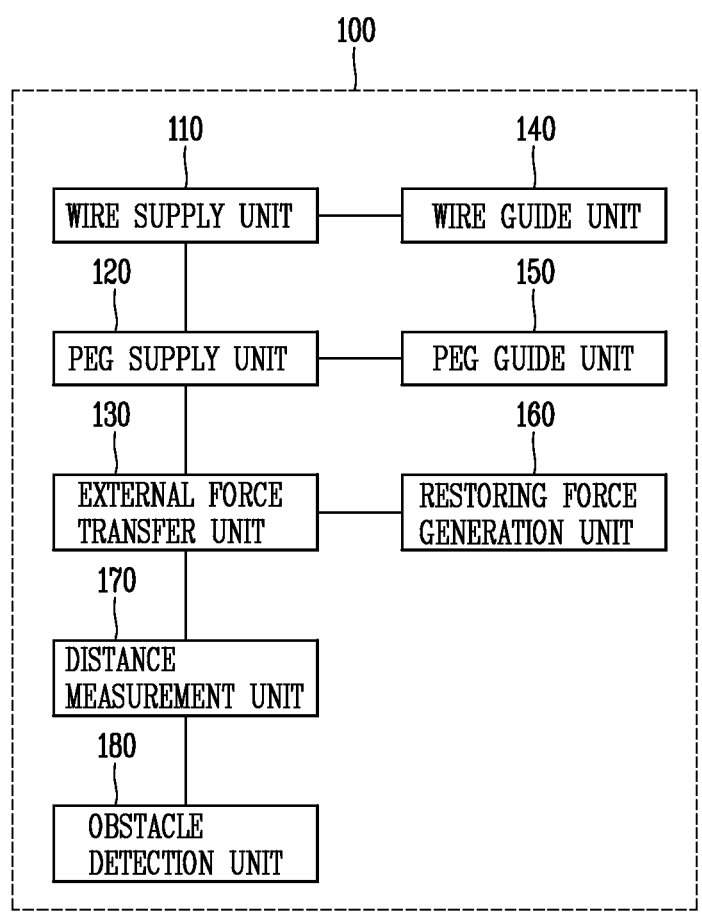
FIG. 1C is a block diagram illustrating an embodiment of a wire installation apparatus according to the present invention.

Referring to FIG. 1C, a wire installation apparatus 100 according to the present invention may include a wire supply unit 110, a peg supply unit 120, an external force transfer unit 130, a wire guide unit 140, a peg guide unit 150, a restoring force generation unit 160, a distance measurement unit 170, and an obstacle detection unit 180.

In detail, the wire supply unit 110 may supply a wire which is to be installed out a lawn-planted area, for defining an operating area 1000 of a lawn mowing robot. The wire supply unit 110 may supply the wire to the lawn-planted area with a dynamic force which the wire supply unit 110 generates autonomously.

Moreover, the wire supply unit 110 may supply the wire along a route through which the wire installation apparatus 100 moves. That is, the wire supply unit 110 may discharge the wire from the wire installation apparatus 100 in a direction opposite to a direction in which the wire installation apparatus 100 moves.

The wire guide unit 140 may guide a direction in which the wire is supplied or a direction in which the wire is discharged. Also, the wire guide unit 140 may control a relative position of a wire and a peg before the peg is driven into the ground. That is, in a case of being discharged from the peg supply unit 120, the wire guide unit 140 may control the relative position of the peg and the wire in order for the wire to be hung on the peg and installed on the ground.

Moreover, the wire guide unit 140 may maintain a tension of the wire, installed on the ground, having a certain tension value or more.

Moreover, the peg supply unit 120 may supply a peg which allows the wire to be driven into the ground. In an embodiment, the peg supply unit 120 may supply a new peg whenever an external force is transferred by the external force transfer unit 130, a previously planted peg is driven into the ground by the external force, and the external force is released. In another embodiment, the peg supply unit 120 may temporarily manage a peg, supplied from a user, before the peg is driven into the ground.

The peg guide unit 150 may control an angle at which the peg is driven into the ground. In this case, the peg guide unit 150 may be connected to one point of the peg supply unit 120.

Moreover, the peg guide unit 150 may control a relative position of the peg and the wire.

The external force transfer unit 130 may transfer an external force, applied from the outside, to the peg in order for the peg to be driven into the ground.

The external force transfer unit 130 may transfer the external force to the peg, and then, when the external force is released, the restoring force generation unit 160 may generate a restoring force in order for the external force transfer unit 130 to be restored to a position before the external force is applied.

The distance measurement unit 170 may measure a distance from one point of the ground, into which the peg is driven, to an arbitrary point. Therefore, the distance measurement unit 170 may provide the user with information associated with the distance from the one point of the ground, into which the peg is driven, to the arbitrary point.

The obstacle detection unit 180 may detect whether there is an obstacle within a certain distance from a position into which the peg is driven.

A lawn mowing system according to the present invention may include the wire installation apparatus 100, a wire 1200 installed by the wire installation apparatus 100, and a moving robot 100*a* or a lawn mowing robot which is configured to mow lawn in an area 1000 corresponding to a closed curve formed by the wire 1200 installed by the wire installation apparatus 100.

Hereinafter, an embodiment of a wire installation apparatus according to the present invention will be described with reference to FIGS. 2A and 2B.

Figure 2A:
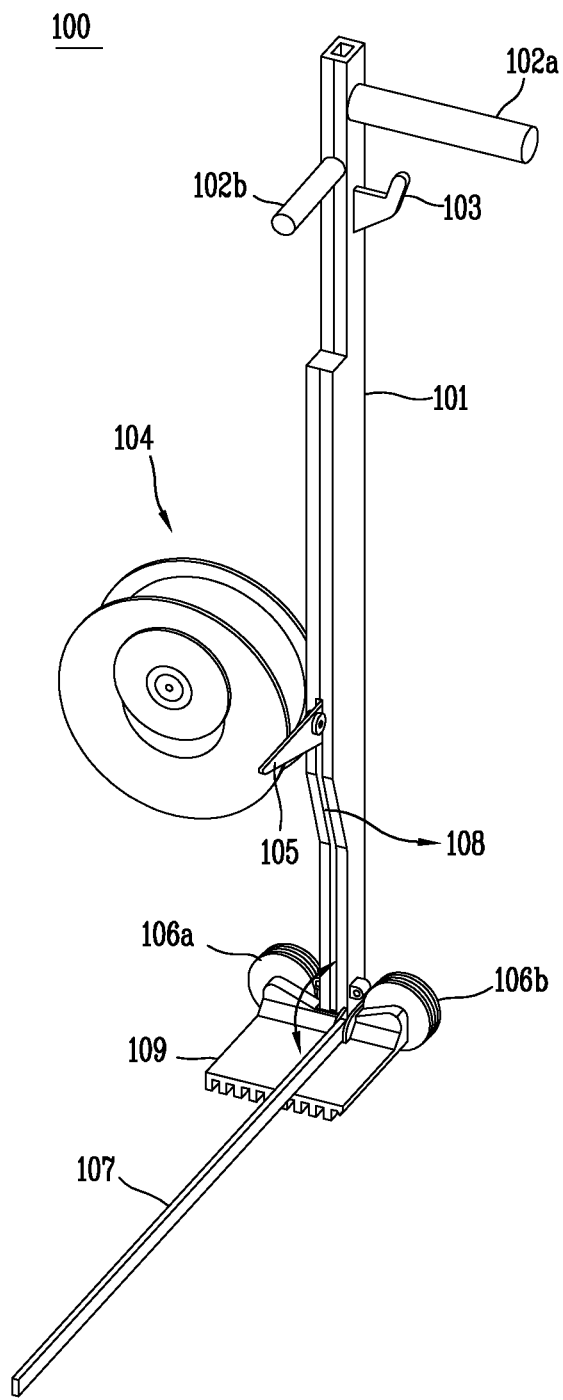
FIGS. 2A and 2B are perspective views illustrating an embodiment of a wire installation apparatus according to the present invention.

Referring to FIG. 2A, a wire installation apparatus 100 may include a body 101 including a through hole through which the peg 10 passes. In an embodiment, the peg supply unit 120 may correspond to the body 101.

In detail, the wire installation apparatus 100 may be supported by the body 101. A first handle 102a and a second handle 102b for gripping the body and a peg rack 103 for keeping a plurality of pegs 10 may be provided in an upper portion of the body 101.

As illustrated in FIG. 2A, the first handle 102a and the second handle 102b may be installed on different surfaces of the body.

Hereinafter, in order to help understand the present specification, with respect to an embodiment illustrated in FIG. 2A, a surface on which the second handle 102b is installed may be defined as a front surface of a body, and a surface opposite to the front surface may be defined as a rear surface. Also, a surface on which the first handle 102a is installed may be defined as a first side surface of the body, and a surface opposite to the first side surface may be defined as a second side surface.

Moreover, a portion where each of the first handle and the second handle is installed may be defined as an upper end of the body 101, and a portion where a prop part 109 is installed may be defined as a lower end of the body 101.

Referring to FIG. 2A, a through hole through which the peg 10 passes may be provided in the body 101. A user may put the peg 10, which fixes the wire 1200, into the through hole.

Moreover, referring to FIG. 2A, the wire installation apparatus 100 may include a reel 104 which is installed in the body 101 and surrounds the wire. The reel 104 may be manufactured in various types. The reel 104 may be detachably attached. In an embodiment, the reel 104 may be included in the wire supply unit 110.

In an embodiment, as the wire installation apparatus 100 or the body 101 moves, the wire wound around the reel 104 may be unwound, and the unwound wire may be installed along a route through which the wire installation apparatus 100 moves.

Referring to FIG. 2A, the wire installation apparatus 100 may include a wire guide member that guide a wire unwound from the reel 104. In detail, the wire guide member may be installed in the lower end of the body 101 and may guide a direction or a type in which the wire is unwound or installed. In an embodiment, the wire guide member may be included in the wire guide unit 140.

In an embodiment, the wire guide member may include a first roller 106a and a second roller 106b, and the first roller 106a and the second roller 106b may be installed on both side surfaces of the body 101.

The first roller 106a and the second roller 106b may be installed in the lower end of the body 101. For example, a rotation shaft of each of the first roller 106a and the second roller 106b may be installed in the prop part 109, and in this case, the first and second rollers may be disposed on the both side surfaces of the body 101.

The wire may be unwound from the reel 104, and then, may be installed on the ground along a route, through which the body has moved, via the first roller and the second roller.

Referring to FIG. 2A, the wire installation apparatus 100 may include an external force transfer member 105 that transfers an external force, transferred from the outside, to the peg 10 in order for the peg 10 located inside the body 101 to be driven into the ground. In an embodiment, the external force transfer member 130 may be included in the external force transfer unit 103.

The body 101 may be provided in order for a user to tread on the external force transfer member 105 in a state of gripping the first handle or the second handle.

Although not shown in FIG. 2, the external force transfer member 105 may include one or more plates having a certain area in order for the user to easily tread on the external force transfer member 105.

The external force transfer member 105 may shuttle in a slit 108 provided on a front surface of the body 101. That is, a slit which enables the external force transfer member 105 to shuttle may be provided on one surface of the body.

In detail, the external force transfer member 105 may transfer a certain force to the peg 10 while falling in the slit 105, and thus, may install the wire and the peg 10 on the ground. Also, the external force transfer member 105 may transfer the force to the peg 10, and then, may return to an initial installation position of the external force transfer member 105 while rising in the slit 105.

Referring to FIG. 2A, the wire installation apparatus 100 may include a rod member 107 for distance measurement. In detail, one end of the rod member 107 may be fixed to a first side surface or a second side surface of the body 101, and thus, the rod member 107 may rotate.

In an embodiment, the rod member 107 for distance measurement may be included in the distance measurement unit 170.

Figure 2B:
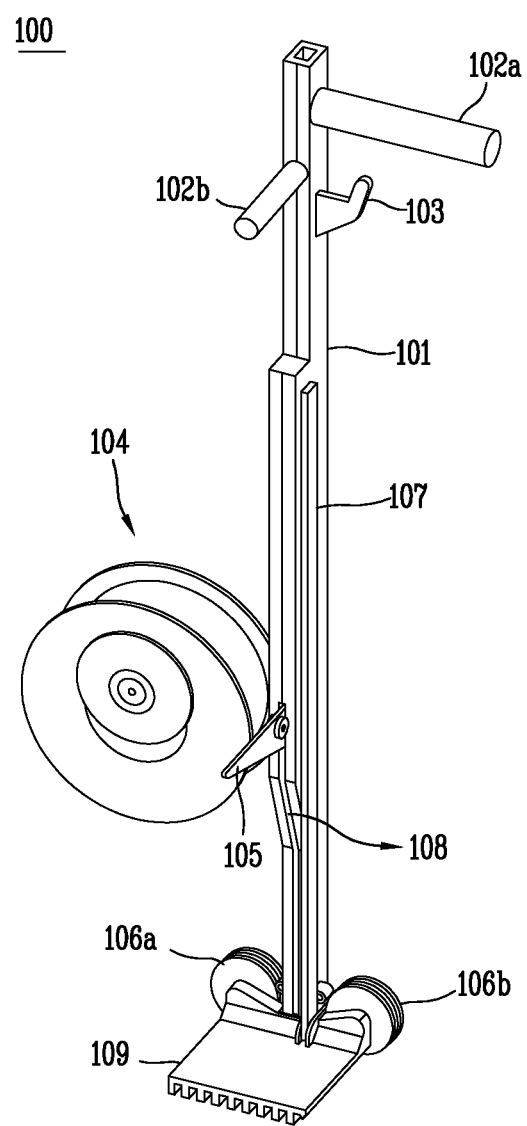

For example, comparing FIGS. 2A and 2B, the rod member 107 may rotate toward the body 101 and may rotate toward the prop part 109.

As another example, a length of the rod member 107 may correspond to a length between a front surface and a rear surface or a width of both side surfaces of a lawn mowing robot 100a.

As another example, a length of the rod member 107 may vary.

A user of the present invention can prevent a collision between the lawn mowing robot 100a and an obstacle in an operating area 1000 by using the rod member 107. That is, when an obstacle is located at a certain distance from a boundary of an area where lawn is planted, the user may determine whether the lawn mowing robot 100a passes through a space between the boundary and the obstacle by using the rod member 107 while moving the wire installation apparatus 100 along the boundary.

For example, when one end of the rod member 107 contacts the obstacle in the middle of moving the wire installation apparatus 100 along a boundary of an area where lawn is planted, the user may install a wire so as to remove the obstacle from the operating area 1000.

Although not shown in FIGS. 2A and 2B, the wire installation apparatus 100 according to the present invention may include a laser member (not shown) that irradiates a laser in a direction opposite to the front surface of the body 101. For example, the laser member may be installed at one point, and may irradiate the laser at a certain angle with respect to the ground.

Figure 3A:
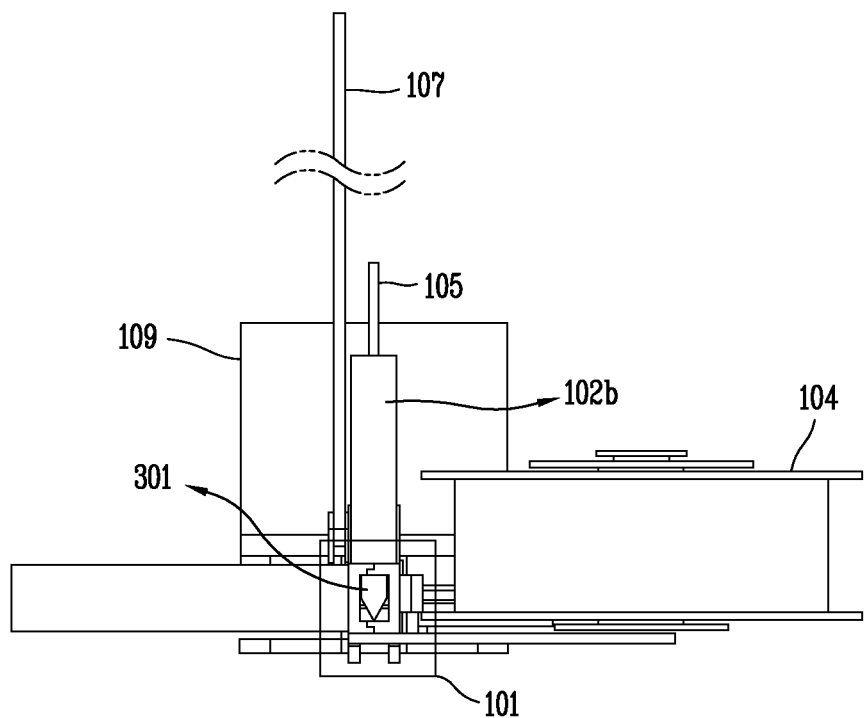
FIGS. 3A and 3B are plan views illustrating an embodiment of a wire installation apparatus according to the present invention.
Figure 3B:
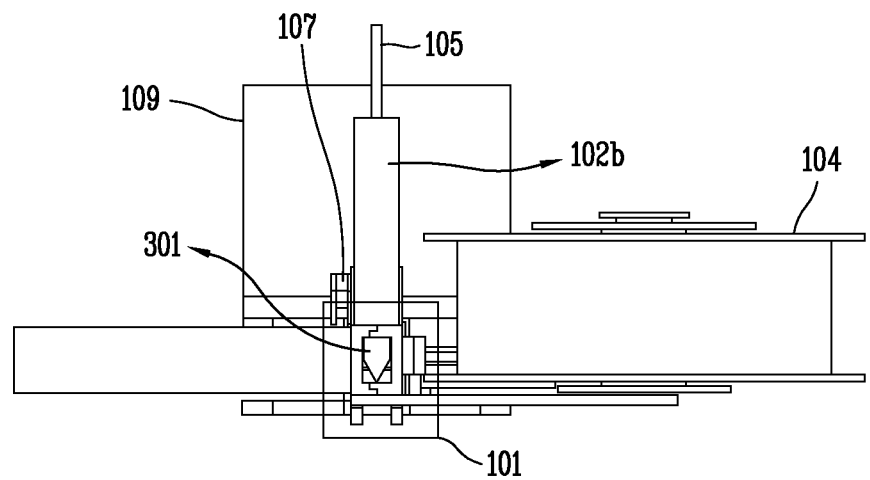

FIGS. 3A and 3B are plan views illustrating an embodiment of a wire installation apparatus according to the present invention.

Referring to FIGS. 3A and 3B, a through hole 301 through which a peg 10 passes may be provided in the body 101.

In detail, a polygon formed by the through hole 301 may include a polygon formed by a cross-sectional surface of the peg 10.

Therefore, a user may easily insert the peg 10 into the body 101, thereby prevent the peg 10 from rotating inside the body 101 or moving by a certain distance or more. That is, since the through hole 301 having a shape similar to that of the peg 10 is formed, the peg 10 can stably be supplied with an external force from the external force transfer member 105.

Figure 4A:
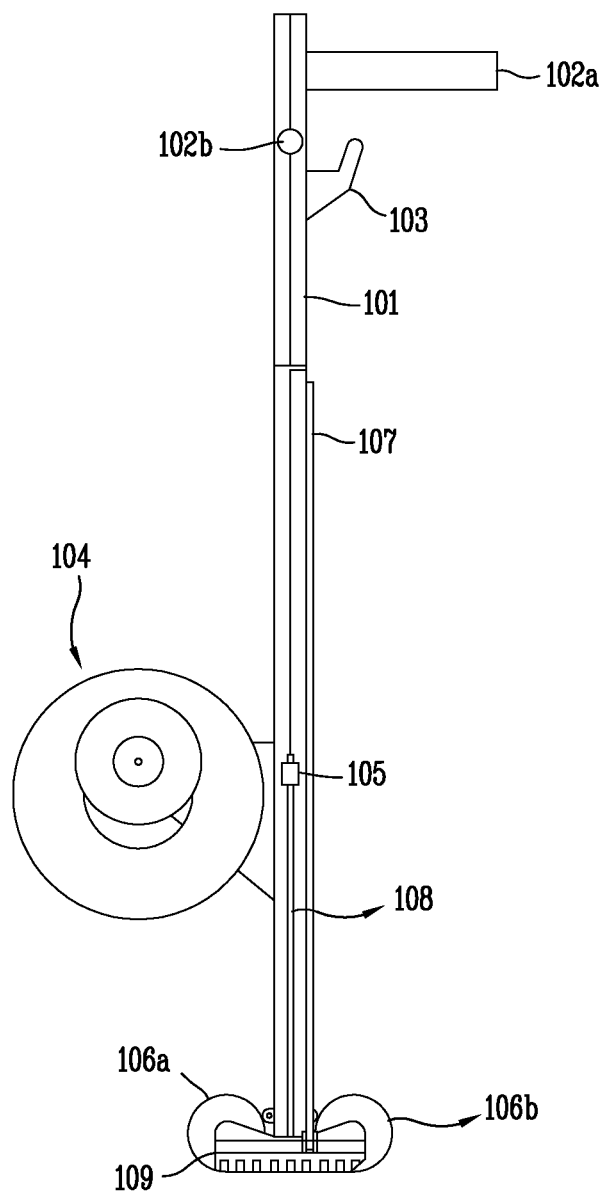
FIG. 4A is a front view illustrating an embodiment of a wire installation apparatus according to the present invention.
Figure 4B:
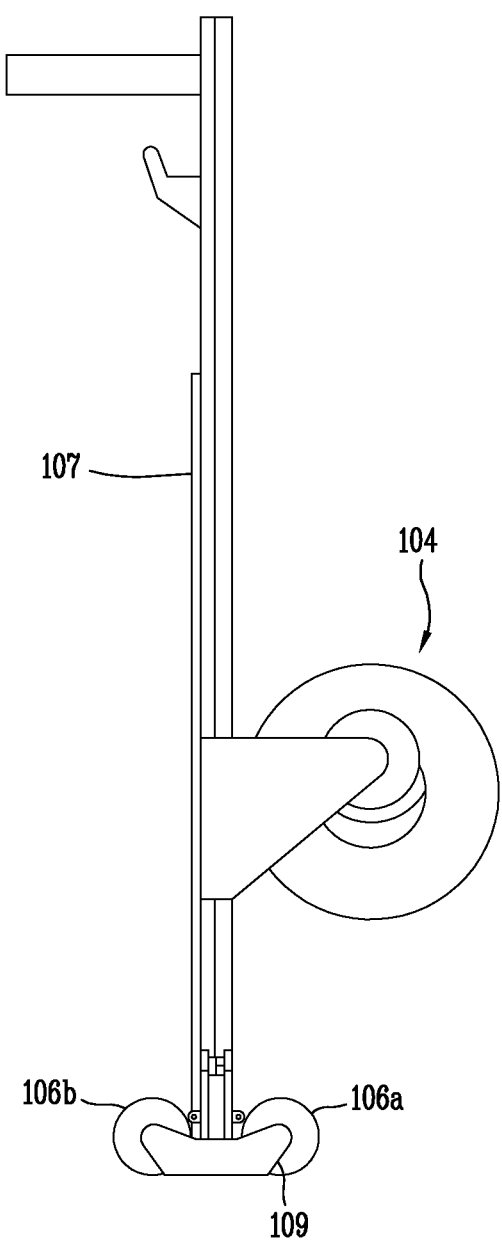
FIG. 4B is a rear view illustrating an embodiment of a wire installation apparatus according to the present invention.

FIG. 4A is a front view illustrating an embodiment of a wire installation apparatus according to the present invention, and FIG. 4B is a rear view illustrating an embodiment of a wire installation apparatus according to the present invention.

As illustrated in FIG. 4A, a rear surface of the prop part 109 may include a plurality of grooves. The plurality of grooves can minimize a damage of lawn.

Comparing FIG. 4A with FIG. 4B, the prop part 109 may fix rotation shafts of the first and second rollers 106a and 106b in both side surfaces.

Referring to FIG. 5A, a wire may contact the reel 104 and the first and second rollers 106a and 106b while maintaining a certain tension, and the wire may be installed along a route through which the wire installation apparatus 100 moves.

Figure 5:
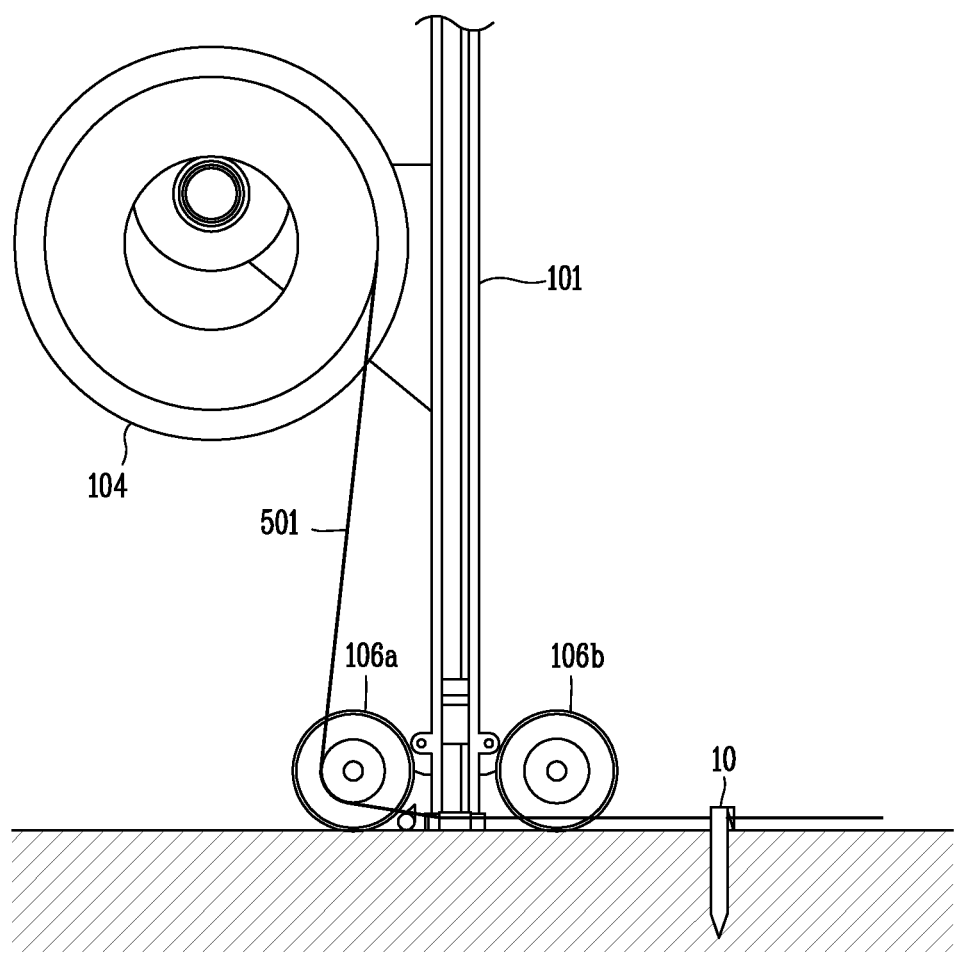
FIG. 5 is a conceptual diagram illustrating a method of installing, by a wire installation apparatus according to the present invention, a wire.

As illustrated in FIG. 5, the wire may be fixedly installed by the peg driven into the ground. Also, a shape of the peg 10 fixing the wire is not limited to a specific shape.

The user of the present invention may fix a wire 501, unwound from the reel 104 of the wire installation apparatus 100, to a specific point before wire installation starts. The wire installation apparatus 100 may install the wire along with the peg 10 with the wire being fixed to the specific point.

Hereinafter, an embodiment of a wire installation apparatus according to the present invention will be described with reference to FIGS. 6A to 6D.

Figure 6A:
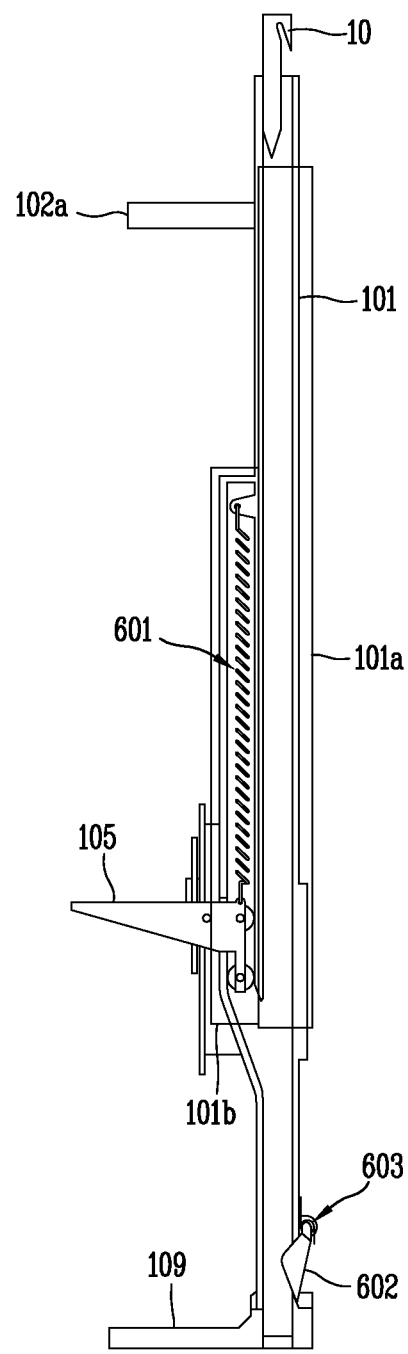
FIGS. 6A to 6D are cross-sectional views illustrating an embodiment of a wire installation apparatus according to the present invention.

As illustrated in FIG. 6A, a portion of the external force transfer member 105 located inside the body 101 may include at least one bearing, and the external force transfer member 105 may be moved inside the body 101 by the bearing.

For example, a moving range of the external force transfer member 105 may correspond to a length of the slit 108 provided in the front surface of the body.

Moreover, referring to FIG. 6A, the external force transfer member 105 may be provided to protrude from the inside of the body 101 to the outside of the body 101. An elastic member 601 may be connected between the portion of the external force transfer member 105 located inside the body 101 and one point of the body 101.

The external force transfer member 105 may transfer an external force to the peg 10, and then, may return to an initial position of the external force transfer member 105 by the elastic member 601.

In detail, as illustrated in FIG. 6A, the inside of the body 101 may include a first portion 101a and a second portion 101b.

The first portion 101a of the body 101 may be a space through which the peg 10 passes, and the second portion 101b of the body 101 may be a space through which the external force transfer member 105 shuttles.

A width of the second portion 101b may be substantially correspond to a diameter of the bearing included in the external force transfer member 105.

Figure 6B:
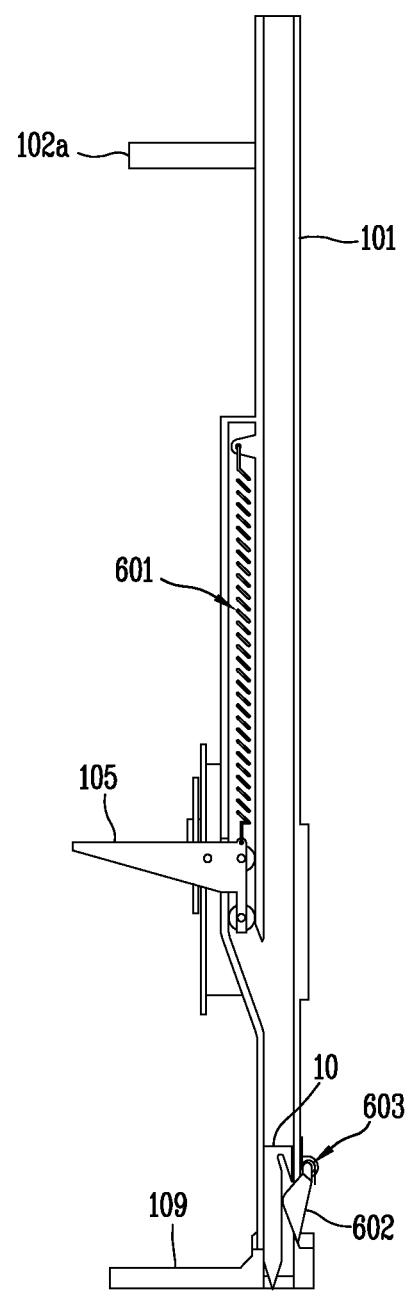

Comparing FIG. 6A with FIG. 6B, the peg 10 may enter a through hole inlet disposed in an upper end of the body 101. Also, the peg 10 may stay in a lower end of the body 101 by a peg fixing member 602 disposed in the lower end of the body 101. In an embodiment, the peg fixing member 602 may be included in the peg guide unit 150.

Figure 6C:
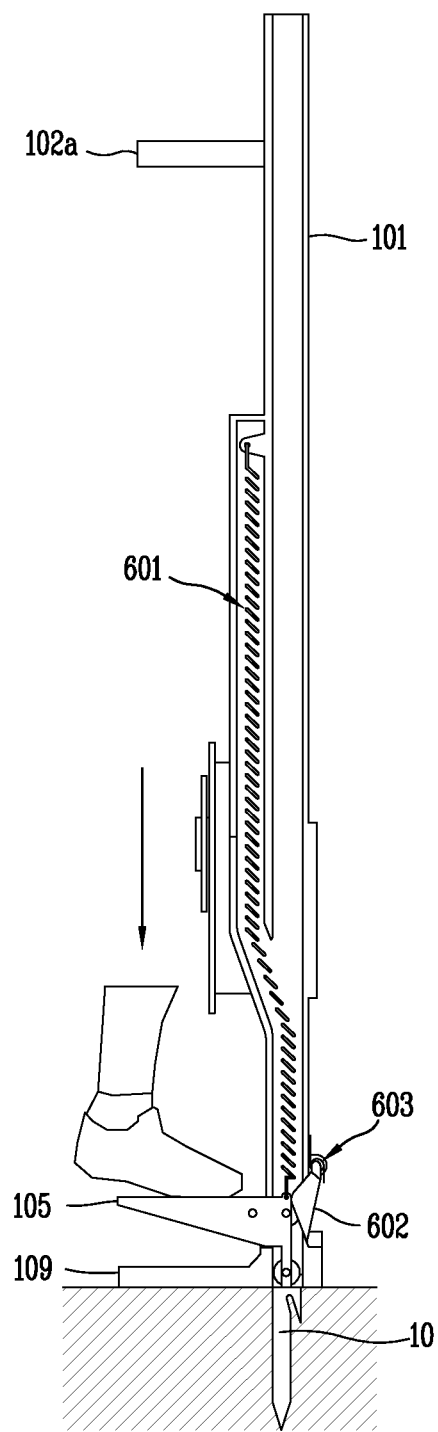

Referring to FIG. 6C, which an external force is applied to the external force transfer member 105 from the user, the external force transfer member 105 may transfer the external force of the user to the peg 10 disposed in the lower end of the body 101 while falling from the initial position of the external force transfer member 105. For example, the user may transfer a certain force to the peg 10 by treading on the external force transfer member 105.

As illustrated in FIG. 6C, when the external force is applied to the peg 10 by the external force transfer member 105, the peg 10 may be driven into the ground along with the wire.

In detail, in a state where the wire 501 is hung on a groove provided in the lower end of the body 101, when the external force is applied to the peg 10, the wire 501 may be bound to a portion of the peg 10, and thus, another portion of the peg 10 may be driven into the ground.

In a case where the peg 10 passes through a through hole outlet disposed in the lower end of the body 101, in order for a portion of the peg 10 binding the wire to be bound to the wire, installation positions of the first and second rollers and a position of the groove provided in the lower end of the body 101 may be determined.

Figure 6D:
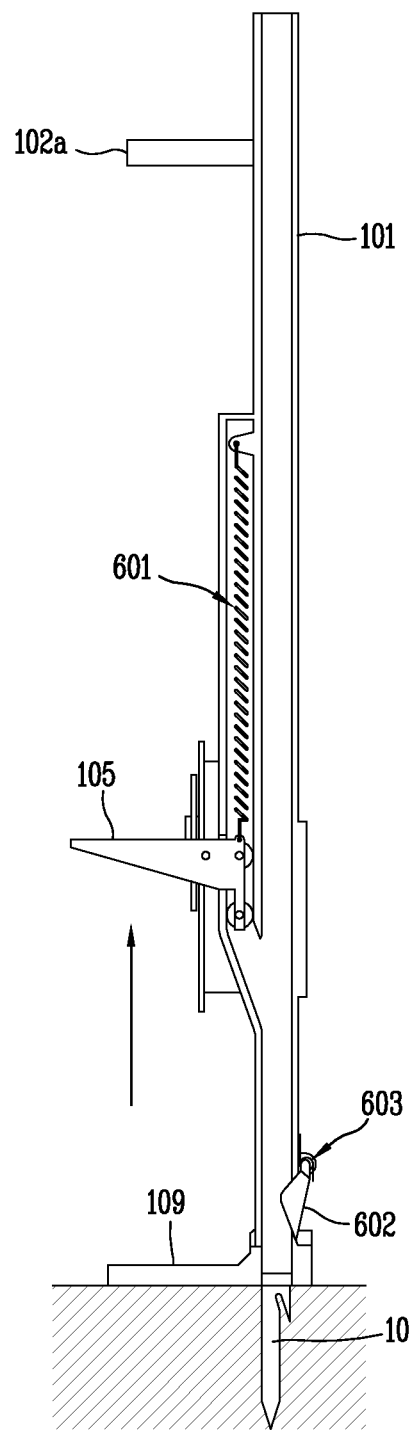

Referring to FIG. 6D, when the external force is not applied from the outside, the external force transfer member 105 may return to the initial position of the external force transfer member 105.

In detail, due to an elastic force supplied from the elastic member 601, the external force transfer member 105 may transfer the external force to the peg 10, and then, may return to the initial position of the external force transfer member 105.

The external force transfer member 105 may be located in the second portion 101b of the body 101 in a state where the external force is not applied thereto, and in a case of transferring the external force to the peg 10, the external force transfer member 105 may be located in the first portion 101a of the body 101.

Figure 7A:
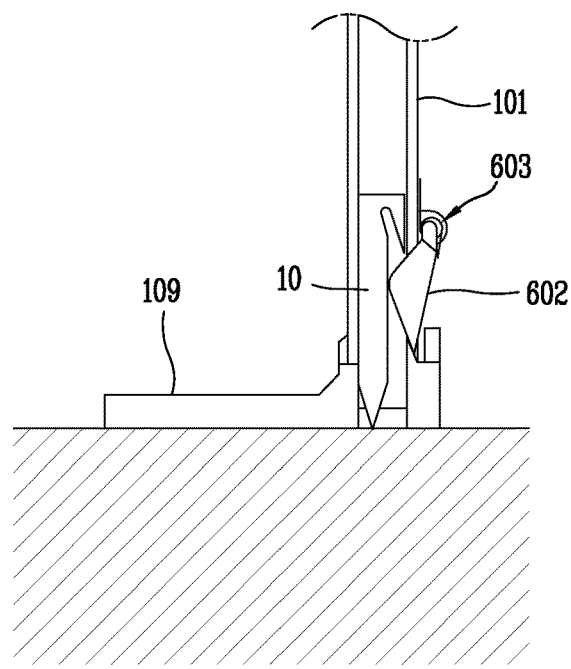
FIGS. 7A to 7C are conceptual diagrams illustrating a method of installing, by a wire installation apparatus according to the present invention, a wire.

Referring to FIG. 7A, the wire installation apparatus 100 may include the peg fixing member 602 disposed in the lower end of the body 101 for preventing a movement of the peg 10.

A spring 603 may be connected between the peg fixing member 602 and the body 101, and the peg fixing member 602 may transfer an elastic force, supplied from the spring 603, to the peg 10 located inside the body 101.

Figure 7B:
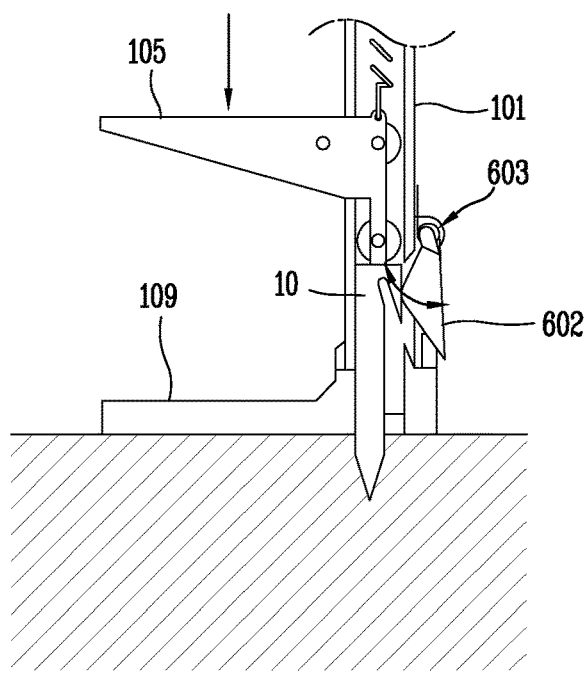

Comparing FIG. 7A with FIG. 7B, in a state where the peg 10 is located in the lower end of the body 101, when the external force is transferred to the peg 10 by the external force transfer member 105, the peg fixing member 602 may move toward the outside of the body 101, and thus, the peg 10 may pass through the through hole outlet disposed in the lower end of the body 101.

Figure 7C:
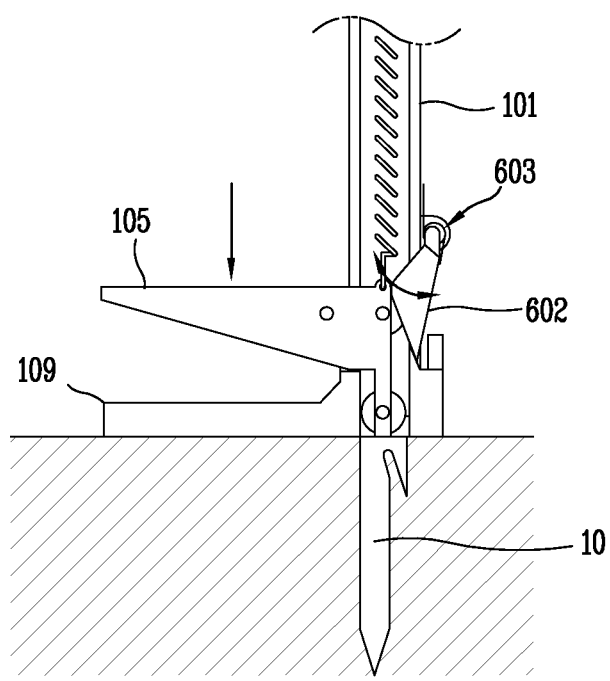

As illustrated in FIGS. 7A to 7C, the peg fixing member 602 may fix a posture of the peg 10 in the body 101, thereby allowing the peg 10 to be normally driven into the ground.

The wire installation apparatus according to the present invention can reduce time and cost which are expended in installing a wire for dividing an operating area of a lawn mowing robot.

Moreover, the wire installation apparatus according to the present invention may drive pegs into the ground at certain intervals, thereby stably installing the wire for dividing the operating area of the lawn mowing robot.

Moreover, the wire installation apparatus according to the present invention may install a wire so as to prevent a collision between the lawn mowing robot and an obstacle located in the operating area even without user's performing a separate measurement operation, and thus, the user can conveniently install the wire.

Moreover, the user of the wire installation apparatus according to the present invention may install the wire for dividing the operating area of the lawn mowing robot while walking upright, thereby enhancing convenience of the user.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Therefore, an aspect of the detailed description is to provide a wire installation apparatus and a control method thereof, which quickly and easily install a wire for dividing an operating area of a lawn mowing robot.

Moreover, another aspect of the detailed description is to provide a wire installation apparatus and a control method thereof, which install a wire while maintaining a constant interval between pegs for fixing the wire, in installing the wire.

Moreover, another aspect of the detailed description is to provide a wire installation apparatus and a control method thereof, which quickly and easily install a wire for dividing an operating area of a lawn mowing robot by applying a relatively small physical force in a state where a user stands upright.

To achieve these and other advantages and in accordance with the purpose of this specification, as embodied and broadly described herein, a wire installation apparatus includes a body through which a peg passes, a reel installed in the body to surround a wire, a wire guide member guiding the wire, and an external force transfer member transferring an external force, applied from the outside, to the peg so that the peg is driven into a ground. The wire is installed by the peg driven into the ground.

According to an embodiment of the present invention, a through hole through which the peg passes may be provided in the body.

According to an embodiment of the present invention, the wire guide member may include a first roller and a second roller respectively disposed on both side surfaces of the body.

According to an embodiment of the present invention, the wire may be unwound from the reel and is installed on the ground along a route, through which the body moves, via the first roller and the second roller.

According to an embodiment of the present invention, the external force transfer member may be provided to protrude from the inside of the body to the outside of the body.

According to an embodiment of the present invention, a slit through which the external force transfer member shuttles may be provided in one surface of the body.

According to an embodiment of the present invention, a portion of the external force transfer member located inside the body may include at least one bearing.

According to an embodiment of the present invention, the wire installation apparatus may further include an elastic member connected between the external force transfer member and the body. Due to an elastic force supplied from the elastic member, the external force transfer member may transfer the external force to the peg and return to an initial position of the external force transfer member.

According to an embodiment of the present invention, the inside of the body may be divided into a first portion through which the peg passes and a second portion through which the external force transfer member moves.

According to an embodiment of the present invention, in a case of transferring the external force to the peg, the external force transfer member may be located in the first portion, and in a state where the external force is not applied thereto, the external force transfer member may be located in the second portion.

According to an embodiment of the present invention, a peg fixing member for preventing a movement of the peg may be provided in a lower end of the body, a spring may be connected between the peg fixing member and the body, and the peg fixing member may transfer an elastic force, supplied from the spring, to the peg located inside the body.

In another aspect of the present invention, a wire installation apparatus includes a wire supply unit configured to supply a wire for defining an operating area of a moving robot, a peg supply unit configured to supply a peg for driving the wire into a ground, and an external force transfer member configured to transfer an external force, applied from the outside, to the peg so that the peg is driven into a ground. The wire is installed by the peg driven into the ground.

According to an embodiment of the present invention, the wire supply unit may supply the wire along a route through which the wire installation apparatus moves.

According to an embodiment of the present invention, the wire installation apparatus may further include a peg guide unit configured to control an angle at which the peg is driven into the ground. The peg guide unit may control a relative position of the peg and the wire.

According to an embodiment of the present invention, the wire installation apparatus may further include a wire guide unit configured to guide a direction in which the wire is supplied.

According to an embodiment of the present invention, the wire guide unit may control a relative position of the peg and the wire.

According to an embodiment of the present invention, the wire guide unit may maintain a tension of the wire having a certain tension value or more.

According to an embodiment of the present invention, the wire installation apparatus may further include a restoring force generation unit configured to, when the external force is released after the external force transfer unit transfers the external force to the peg, restore the external force transfer unit to a position before the external force is applied.

According to an embodiment of the present invention, the wire installation apparatus may further include an obstacle detection unit configured to detect whether an obstacle is located within a certain distance from a position into which the peg is driven.

According to an embodiment of the present invention, the wire installation apparatus may further include a distance measurement unit configured to measure a distance from a position, into which the peg is driven, to an arbitrary point.

The wire installation apparatus according to the present invention can reduce time and cost which are expended in installing a wire for dividing an operating area of a lawn mowing robot.

Moreover, the wire installation apparatus according to the present invention may drive pegs into the ground at certain intervals, thereby stably installing the wire for dividing the operating area of the lawn mowing robot.

Moreover, the wire installation apparatus according to the present invention may install a wire so as to prevent a collision between the lawn mowing robot and an obstacle located in the operating area even without user's performing a separate measurement operation, and thus, the user can conveniently install the wire.

Moreover, the user of the wire installation apparatus according to the present invention may install the wire for dividing the operating area of the lawn mowing robot while walking upright, thereby enhancing convenience of the user.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wire installation apparatus comprising:
a body;
a reel installed at the body to surround a wire;
a wire guide member to guide the wire away from the reel; and
an external force transfer member to transfer an external force to a peg such that the peg is to be driven from inside of the body to a ground,
wherein the wire is installed by the peg driven to the ground,
wherein the external force transfer member is to protrude from said inside of the body to outside of the body,
wherein the body includes a through hole through which the peg passes from the body to the ground,
wherein the wire guide member includes a first roller at a first side of the body and a second roller at a second side of the body, and
wherein based on movement of the body along a route, the wire is to be unwound from the reel and is to be provided at the ground along the route through which the body moves, via the first roller and the second roller.

2. The wire installation apparatus of claim 1, wherein the body includes a slit to allow movement of the external force transfer member.

3. The wire installation apparatus of claim 1, wherein a portion of the external force transfer member provided in said inside of the body includes at least one bearing.

4. The wire installation apparatus of claim 1, comprising:
an elastic member coupled between the external force transfer member and the body,
wherein based on an elastic force from the elastic member, the external force transfer member to transfer the external force to the peg and to return to an initial position of the external force transfer member.

5. The wire installation apparatus of claim 1, wherein said inside of the body includes a first portion through which the peg passes and a second portion through which the external force transfer member moves.

6. The wire installation apparatus of claim 5, wherein
when the external force is transferred from the external force transfer member to the peg, the external force transfer member is at the first portion, and
when the external force is not transferred from the external force transfer member to the peg, the external force transfer member is at the second portion.

7. The wire installation apparatus of claim 1, wherein
a peg fixing member, at one end of the body, to prevent movement of the peg,
a spring coupled between the peg fixing member and the body, and wherein the peg fixing member is to transfer an elastic force, from the spring, to the peg in said inside of the body.

8. A wire installation apparatus comprising:
a body;
a wire supply device configured to supply a wire;
a wire guide device configured to guide a direction in which the wire is provided;
a peg supply device configured to provide a peg to allow the wire to be driven to a ground; and
an external force transfer member configured to transfer an external force to the peg such that the peg is to be driven from inside of the body to the ground,
wherein the wire is installed by the peg driven to the ground,
wherein the external force transfer member is to protrude from said inside of the body to outside of the body,
wherein the body includes a through hole through which the peg passes from the body to the ground,
wherein the wire guide device includes a first roller at a first side of the body and a second roller at a second side of the body, and
wherein based on movement of the body along a route, the wire is to be unwound from the reel and is to be provided at the ground along the route through which the body moves, via the first roller and the second roller.

9. The wire installation apparatus of claim 8, wherein based on movement of the wire installation apparatus, the wire supply device to supply the wire along a movement route of the wire installation apparatus.

10. The wire installation apparatus of claim 8, comprising:
a peg guide device configured to control an angle at which the peg is driven to the ground,
wherein the peg guide device to control a relative position of the peg and the wire.

11. The wire installation apparatus of claim 8, wherein the wire guide device to control a relative position of the peg and the wire.

12. The wire installation apparatus of claim 8, wherein the wire guide device to maintain a tension of the wire having at least a prescribed tension value.

13. The wire installation apparatus of claim 8, further comprising:
a restoring force generation device configured to restore the external force transfer member to a prior position of the external force transfer member when the external force is released.

14. The wire installation apparatus of claim 8, further comprising:
an obstacle detection device configured to determine whether an obstacle is within a prescribed distance from a peg driven position of the peg, wherein the peg driven position is a position at which the peg is to be driven to the ground.

15. The wire installation apparatus of claim 8, further comprising:
a distance measurement device configured to determine a distance from a peg driven position of the peg to an arbitrary point, wherein the peg driven position is a position at which the peg is to be driven to the ground.

16. A wire installation apparatus comprising:
a body having a slit and a first end, the first end to allow a wire and a peg to pass through;
a support device at the body to support the body;
a wire guide to guide the wire from a reel; and
an external force transfer member to move along the slit based on an external force, wherein the external force to drive the peg from inside of the body to an external surface, wherein the wire is to be provided to the surface at least by the peg driven to the surface, and wherein after receiving the external force, the external force transfer member to return to an initial position,
wherein the external force transfer member is to protrude from said inside of the body to outside of the body,
wherein the body includes a through hole through which the peg passes from the body to the external surface,
wherein the wire guide includes a first roller at a first side of the body and a second roller at a second side of the body, and
wherein based on movement of the body along a route, the wire is to be unwound from the reel and is to be provided at the external surface along the route through which the body moves, via the first roller and the second roller.

* * * * *